(12) United States Patent
McHugh

(10) Patent No.: US 6,810,910 B2
(45) Date of Patent: Nov. 2, 2004

(54) VALVE AND ARRANGEMENT FOR FIRE SUPPRESSION SYSTEM

(75) Inventor: George J. McHugh, Broomall, PA (US)

(73) Assignee: AGF Manufacturing, Inc., Malvern, PA (US)

( * ) Notice: Subject to any disclaimer, the term of this patent is extended or adjusted under 35 U.S.C. 154(b) by 167 days.

(21) Appl. No.: 09/971,679

(22) Filed: Oct. 9, 2001

(65) Prior Publication Data

US 2002/0014270 A1 Feb. 7, 2002

Related U.S. Application Data

(63) Continuation-in-part of application No. 09/235,834, filed on Jan. 22, 1999, now Pat. No. 6,302,146.

(51) Int. Cl.[7] .......................... F16K 37/00; G01M 19/00
(52) U.S. Cl. ................... 137/601.16; 137/559; 73/168; 73/DIG. 8; 169/23; 169/61; 239/71; 239/DIG. 15
(58) Field of Search ................................ 137/551, 552, 137/559, 601.16; 251/118; 73/168, DIG. 8; 239/71, DIG. 15; 169/16, 17, 23, 61

(56) References Cited

U.S. PATENT DOCUMENTS

| | | | |
|---|---|---|---|
| 291,818 A | 1/1884 | Tudor | |
| 753,634 A | 3/1904 | Sankey | |
| 1,196,862 A | 9/1916 | Hayes | |
| 1,436,650 A | 11/1922 | Gilbert | |
| 2,146,878 A | * 2/1939 | Argogast | ................. 137/552.7 |
| 2,244,311 A | 6/1941 | Nee et al. | |
| 2,261,437 A | 11/1941 | Galbraith | |
| 2,634,748 A | 4/1953 | Morrison | |
| 2,922,436 A | 1/1960 | Brash | |
| 2,933,139 A | 4/1960 | O'Rear | |
| 3,422,840 A | 1/1969 | Bryant et al. | |
| 3,825,766 A | 7/1974 | Connor et al. | |
| 4,561,471 A | 12/1985 | Diaz | |
| 4,580,596 A | 4/1986 | Stehling | |
| 4,643,224 A | 2/1987 | Rung et al. | |
| 4,655,078 A | 4/1987 | Johnson | |
| 4,704,983 A | * 11/1987 | Rung | ......................... 137/559 |
| 4,741,361 A | 5/1988 | McHugh | |
| 4,852,610 A | 8/1989 | McHugh | |
| 4,971,109 A | 11/1990 | McHugh | |
| 4,995,423 A | 2/1991 | McHugh | |
| 5,018,386 A | 5/1991 | Zeoli | |
| 5,090,446 A | 2/1992 | Hunter et al. | |
| 5,103,862 A | 4/1992 | McHugh | |
| 5,178,185 A | 1/1993 | Stehling et al. | |
| 5,269,344 A | * 12/1993 | McHugh | ..................... 137/559 |
| 5,320,138 A | 6/1994 | Ferlitch, Jr. | |
| 5,406,979 A | 4/1995 | McHugh | |
| 5,662,139 A | 9/1997 | Lish | |
| 5,720,351 A | * 2/1998 | Beukema et al. | ............. 169/61 |
| 5,864,287 A | 1/1999 | Evans, Jr. et al. | |

FOREIGN PATENT DOCUMENTS

EP    0 646 744    4/1995

* cited by examiner

Primary Examiner—John Rivell
(74) Attorney, Agent, or Firm—Burns, Doane, Swecker & Mathis, L.L.P.

(57) ABSTRACT

A valve and valve arrangement for a fire suppression system includes a remotely controlled valve such as a solenoid valve which is electrically controlled to provide a preselected flow through the remotely controlled valve corresponding to the flow through a single sprinkler head.

18 Claims, 11 Drawing Sheets

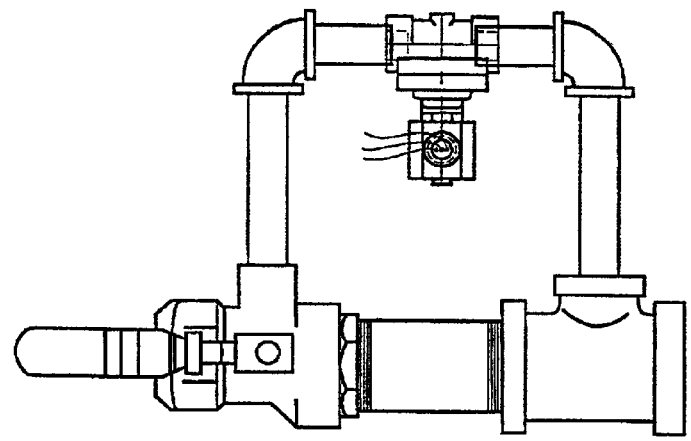
FIG. 10A
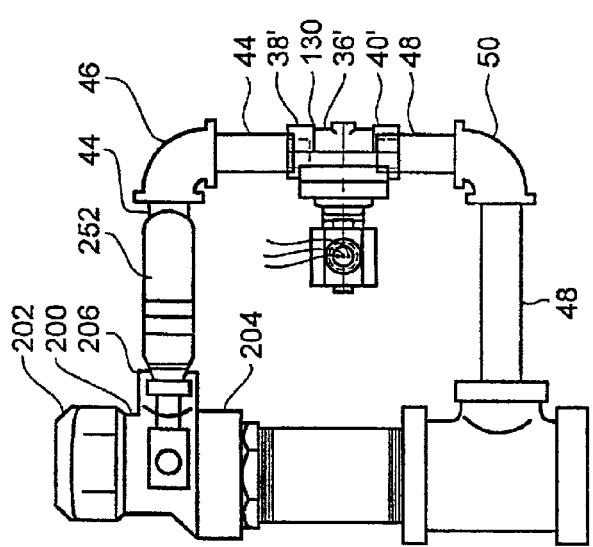
FIG. 9A
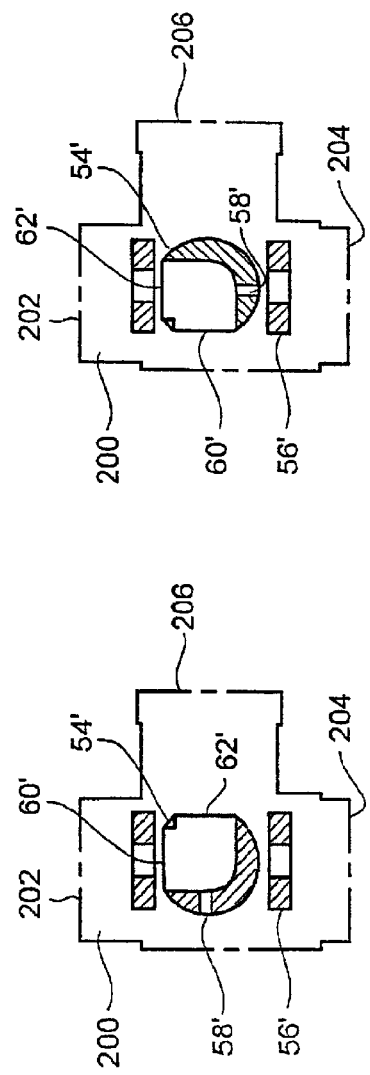
FIG. 10B
FIG. 9B

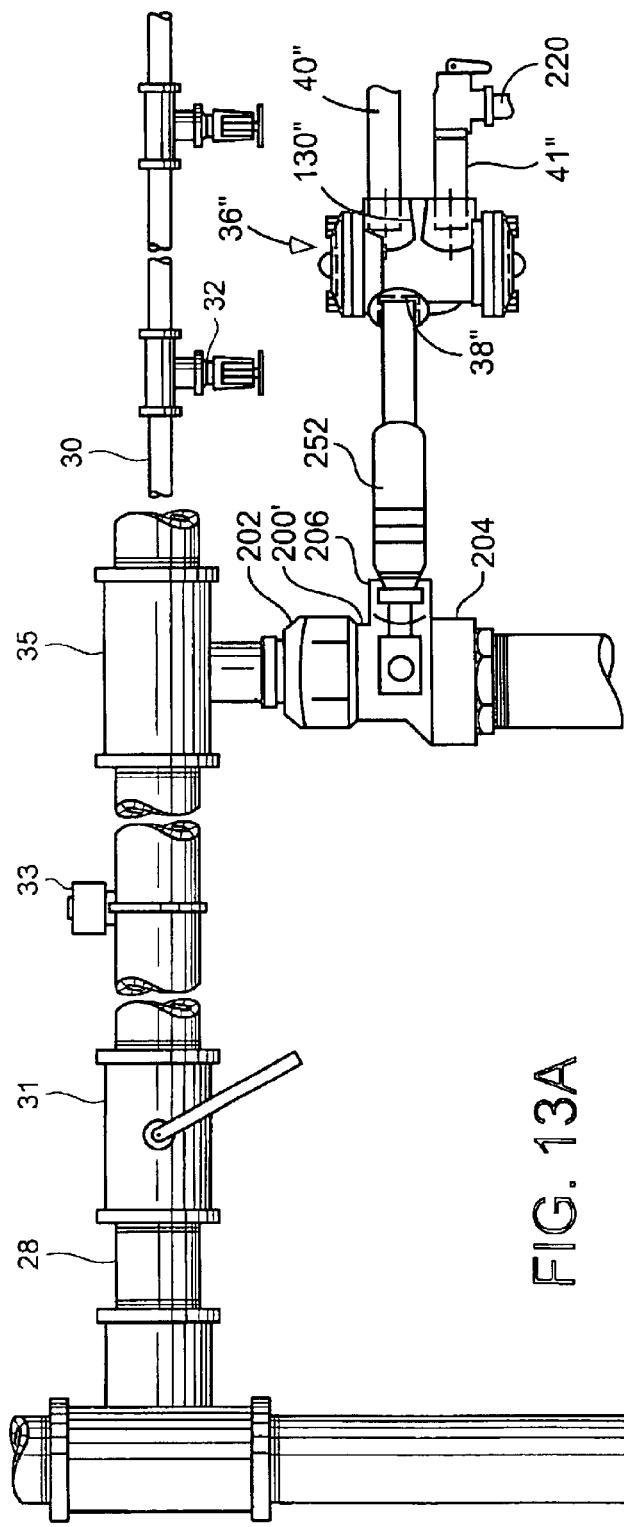
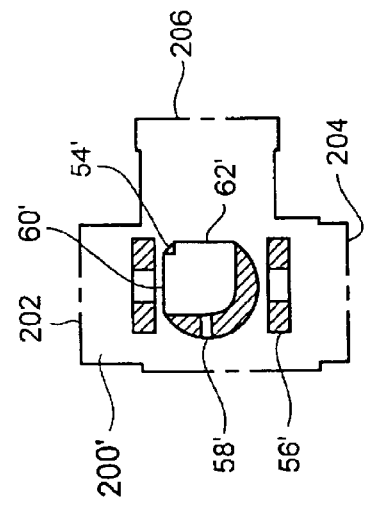
FIG. 13A
FIG. 13B

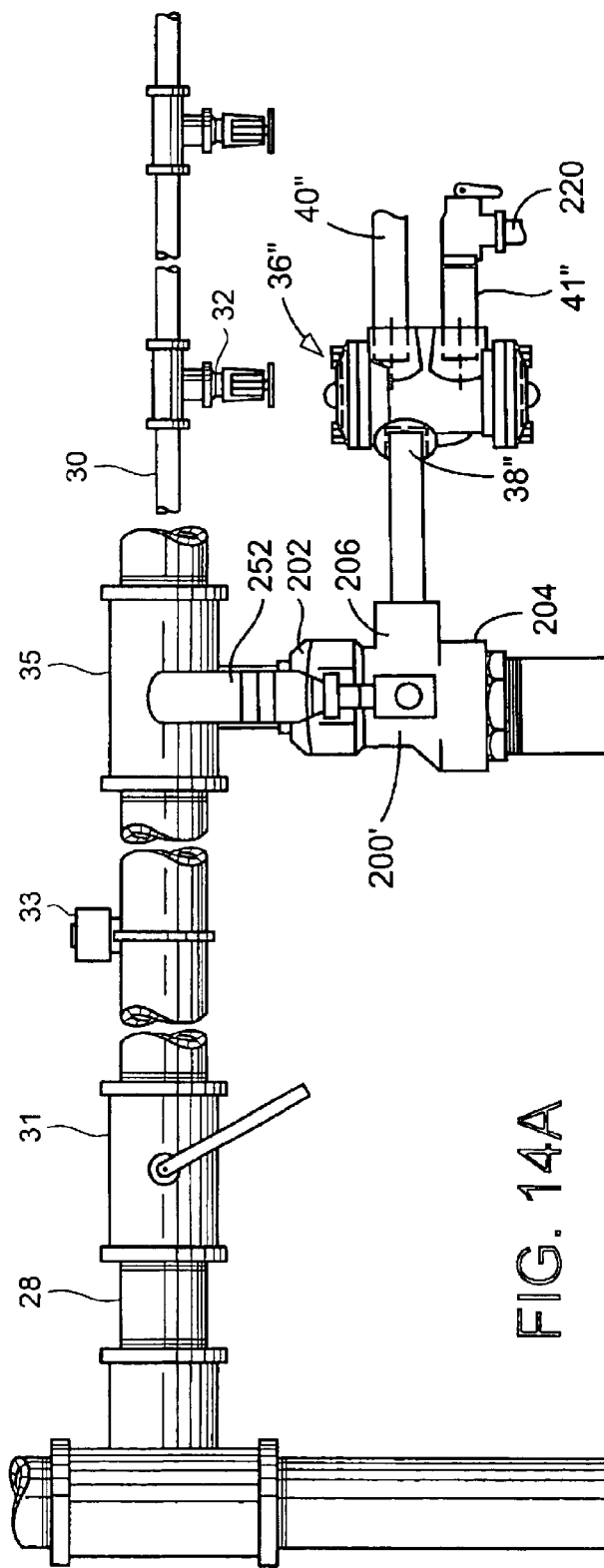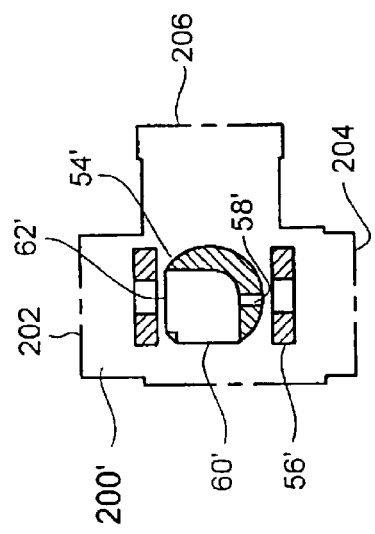
FIG. 14A
FIG. 14B

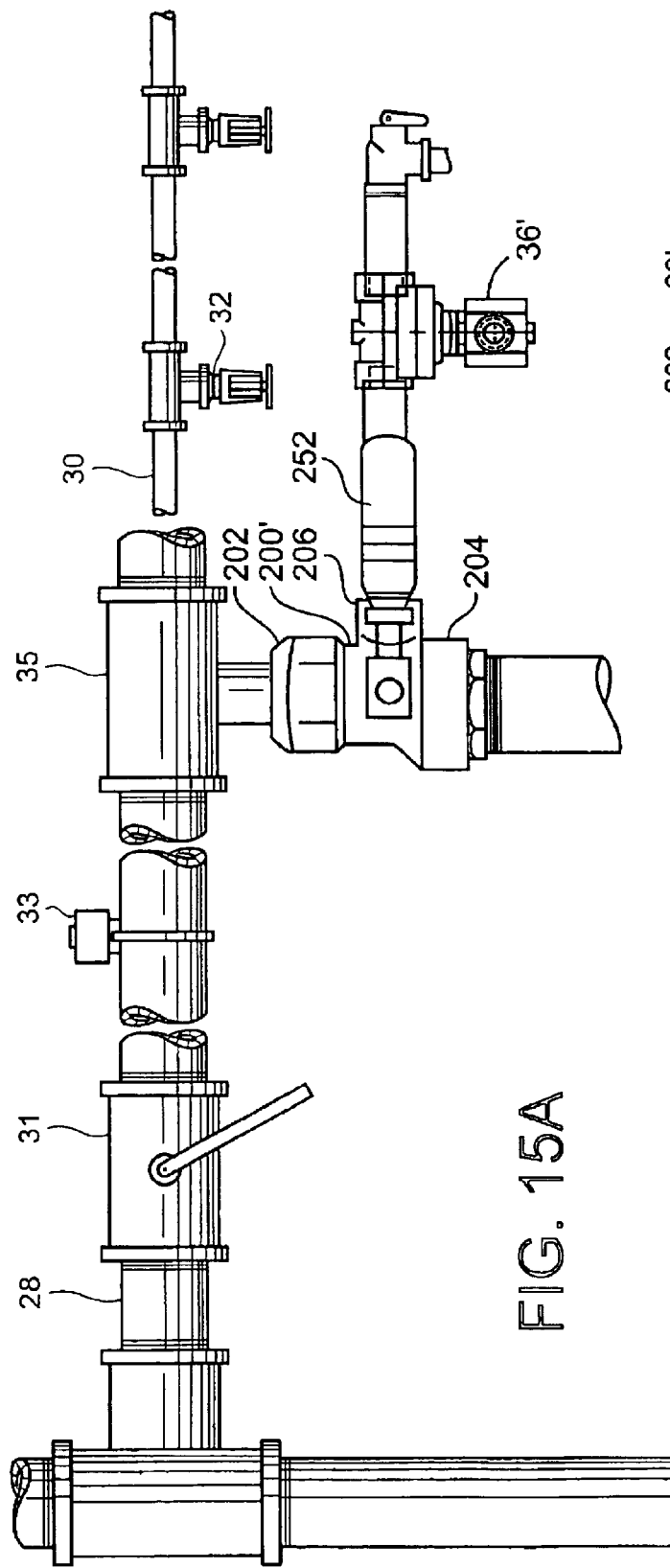
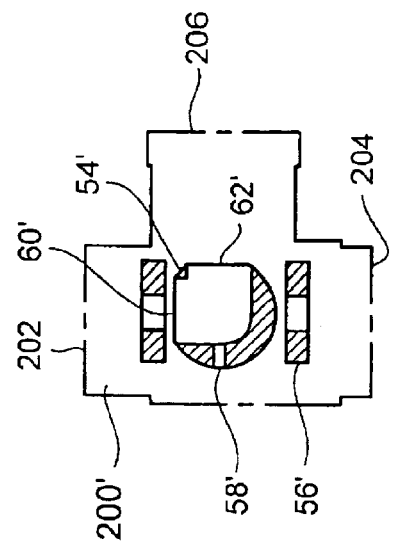
FIG. 15A
FIG. 15B

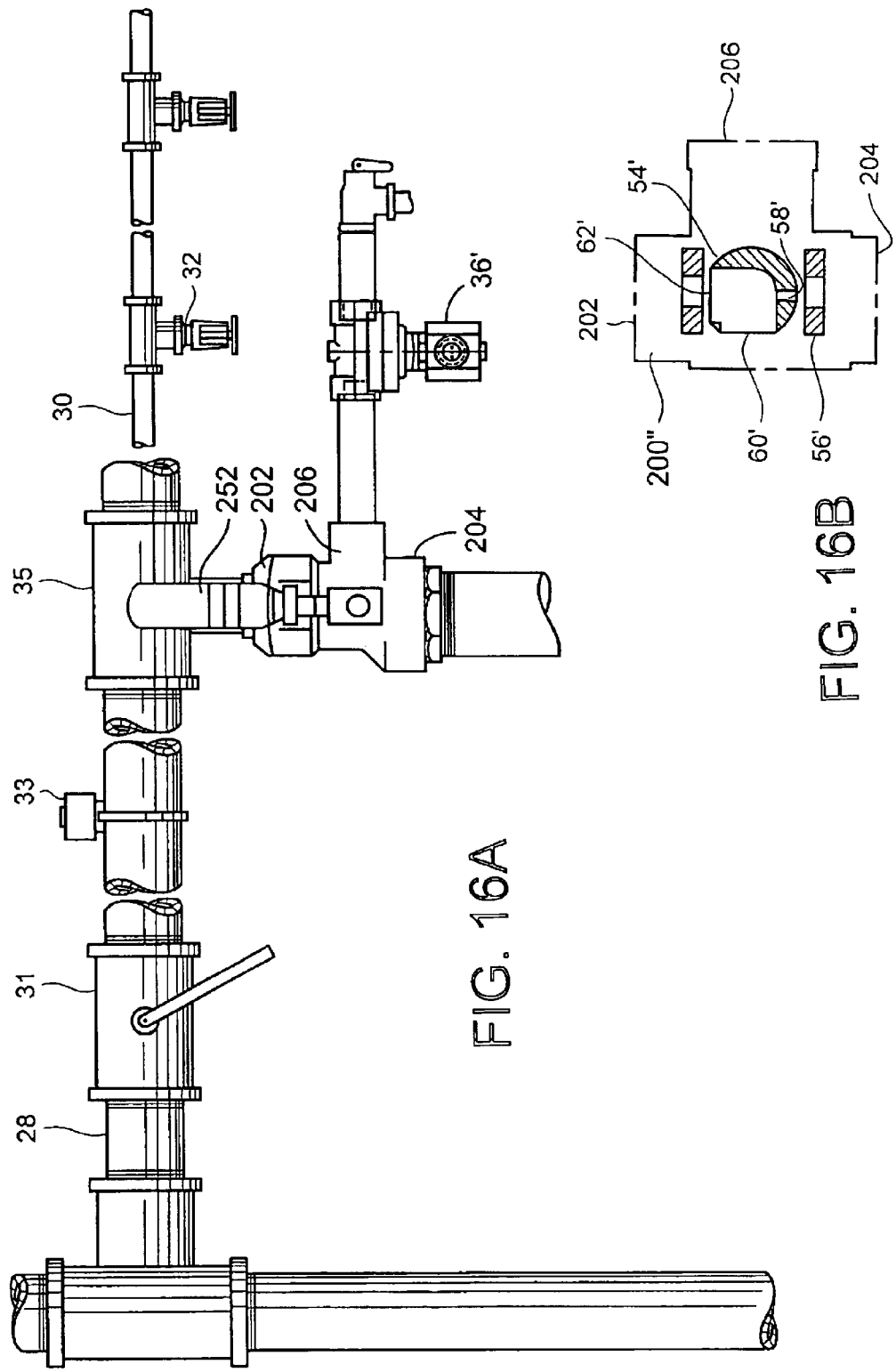

VALVE AND ARRANGEMENT FOR FIRE SUPPRESSION SYSTEM

CROSS-REFERENCE TO RELATED APPLICATIONS

This application is a continuation-in-part of U.S. application Ser. No. 09/235,834, filed Jan. 22, 1999, now U.S. Pat. No. 6,302,146, the entire contents of which are hereby incorporated by reference.

TECHNICAL FIELD

The present invention relates generally to valves and more particularly relates to valve arrangements for use in testing fire suppression water sprinkler systems.

BACKGROUND OF THE INVENTION

In a typical fire suppression water sprinkler system as installed in many buildings, an array of individual fire sprinklers is supplied with water through a main conduit and various branch conduits. The individual fire sprinklers are generally provided with a member that melts when the ambient temperature reaches a predetermined level indicative of a fire. The melting of the member opens a fire sprinkler to spray water in order to suppress the fire. The individual fire sprinklers are provided with meltable members so that the spray of water will hopefully be limited to the region of the building where the fire is present. In this way, the extent of water damage may be minimized.

Such fire suppression systems also oftentimes have a switch or sensor that detects the flow of water in the conduits to indicate when even only one of the individual water sprinklers has opened. Since the flow of water in the conduits generally means that a fire is present in the building, the switch or sensor typically triggers a fire alarm or sends an appropriate signal directly to a fire department. Therefore, many codes require, and it is generally otherwise desirable, that the switch or sensor which detects the flow of water in the conduits be periodically tested. Accordingly, it has also become conventional in the art to provide a valve which enables the system to be tested by permitting a flow of water therethrough corresponding to the flow which would occur when only one individual water sprinkler has been opened.

Various valves and arrangements for testing and also for draining fire suppression systems are known in the art such as are shown and described in U.S. Pat. Nos. 5,103,862, 4,971,109, 4,995,423, 4,852,610, 4,741,361 all of AGF Manufacturing, Inc. These patents are each incorporated herein by reference.

In the known valves and arrangements for testing fire suppression systems, the testing valve is operated manually with the inspector or maintenance personnel positioned at the testing valve. Being adjacent to the testing valve also permits the inspector or maintenance personnel to visually observe the flow of water through the testing valve through one or more sight glasses, if provided, or through the outlet of the testing valve if the outlet is not piped directly to a closed drain.

SUMMARY OF THE PRESENT INVENTION

In view of the above background information, it is an object of the present invention to provide a testing valve and testing valve arrangement by which a fire suppression system may be tested remotely.

A further object of the present invention is to provide a testing valve and testing valve arrangement by which a fire suppression system may be tested remotely, economically, and relatively easily.

It is another object of the present invention to provide a testing valve and testing valve arrangement by which a fire suppression system may be tested remotely using an electrically controlled solenoid valve, an electrically or pneumatically actuated valve or other known valve means.

An additional object of the present invention is to provide a testing valve and testing valve arrangement by which a fire suppression system may be tested remotely using an electrically controlled solenoid valve and in which the flow through the solenoid valve is restricted to replicate or provide a flow equivalent to the flow through a specific sprinkler head in the system being tested.

The above objects as well as other objects not specifically mentioned are accomplished by a valve arrangement for remotely testing a fire suppression sprinkler system, in accordance with the present invention, in which a conduit supplies a fire suppression fluid to a plurality of sprinklers and a sensing arrangement is provided for sensing a flow of the fire suppression fluid in the conduit. In the arrangement, a flow is provided through a passageway corresponding to the flow of said fire suppression fluid through one of said sprinklers with a remotely controlled valve selectively opening and closing the passageway, whereby said fire suppression sprinkler system may be remotely tested.

In another embodiment of the present invention, a remotely controlled valve is provided with a restricted opening corresponding to the flow through a sprinkler head of a fire suppression system.

In another preferred embodiment of the present invention, a valve arrangement for use in a fire suppression sprinkler system comprises a first valve for controlling the flow of a fluid. The first valve comprises an inlet and first and second outlets. The first valve also comprises a first configuration selectively preventing flow from the inlet to the first outlet and a second configuration selectively permitting flow from the inlet to the first outlet at a preselected rate corresponding to the flow through a single fire suppression sprinkler. The first valve also permits flow from the inlet to the second outlet when the valve is in the first configuration. A second valve controls the flow of a fluid, with the second valve comprising an inlet and an outlet, with the inlet of the second valve being in communication with the second outlet of said first valve. The second valve comprises a first configuration selectively preventing flow from the inlet to the outlet of the second valve and a second configuration selectively permitting flow from the inlet to the outlet of the second valve. The flow through the second valve is also restricted to a preselected rate corresponding to the flow through a single fire suppression sprinkler. In a preferred embodiment, one of the first and second valves is remotely actuated and the other valve is manually actuated. The manually actuated valve thereby permits a manual confirmation of the flow test of the sprinkler system which is performed by the remotely actuated valve.

According to another preferred embodiment, a valve arrangement for remotely testing a fire suppression sprinkler system comprises a conduit for supplying a fire suppression fluid to a plurality of sprinklers with a sensor for sensing a flow of the fire suppression fluid in the conduit. A supply valve controls a flow of fluid through the conduit with a first testing valve testing the sensor and with the first testing valve comprising an inlet and an outlet. The first testing valve comprises a first configuration selectively preventing flow from the inlet to the outlet and a second configuration selectively permitting flow from the inlet to the outlet at a preselected rate corresponding to the flow through a single fire suppression sprinkler. A second testing valve tests the sensor with the second testing valve comprising an inlet and an outlet. The inlet of the second valve is in communication with the conduit downstream of the supply valve with the flow through the second testing valve being restricted to a preselected rate corresponding to the flow through a single fire suppression sprinkler.

BRIEF DESCRIPTION OF THE DRAWINGS

The preferred embodiments of the present invention will be described in greater detail with reference to the accompanying drawings, wherein like members bear like reference numerals and wherein:

FIG. 2b is a schematic view in partial cross-section of one of the valves of the arrangement of FIG. 2a;

FIG. 3b is a schematic view in partial cross-section of one of the valves of the arrangement of FIG. 3a;

FIG. 4b is a schematic view in partial cross-section of one of the valves of the arrangement of FIG. 4a;

FIG. 9a is a side view of another valve arrangement of the present invention with one of the valves in the "close" configuration;

FIG. 9b is a schematic view in partial cross-section of one of the valves of the arrangement of FIG. 9a;

FIG. 10a is a view of the valve arrangement of FIG. 9a with one of the valves in the "test" configuration;

FIG. 10b is a schematic view in partial cross-section of one of the valves of the arrangement of FIG. 10a;

FIG. 13A is a side view of another valve arrangement according to the present invention with one of the valves in the "off" configuration;

FIG. 13B is a schematic view in partial cross-section of one of the valves of the arrangement of FIG. 13A;

FIG. 14A is a side view of the valve arrangement shown in FIG. 13A with one of the valves in the "test" configuration;

FIG. 14B is a schematic view in partial cross-section of one of the valves of the arrangement of FIG. 14A;

FIG. 15A is a side view of another valve arrangement according to the present invention with one of the valves in the "off" configuration;

FIG. 15B is a schematic view in partial cross-section of one of the valves of the arrangement of FIG. 15A;

FIG. 16A is a side view of the valve arrangement shown in FIG. 15A with one of the valves in the "test" configuration; and FIG. 16B is a schematic view in partial cross-section of one of the valves of the arrangement of FIG. 16A.

DETAILED DESCRIPTION OF THE PREFERRED EMBODIMENTS

Figure 1:
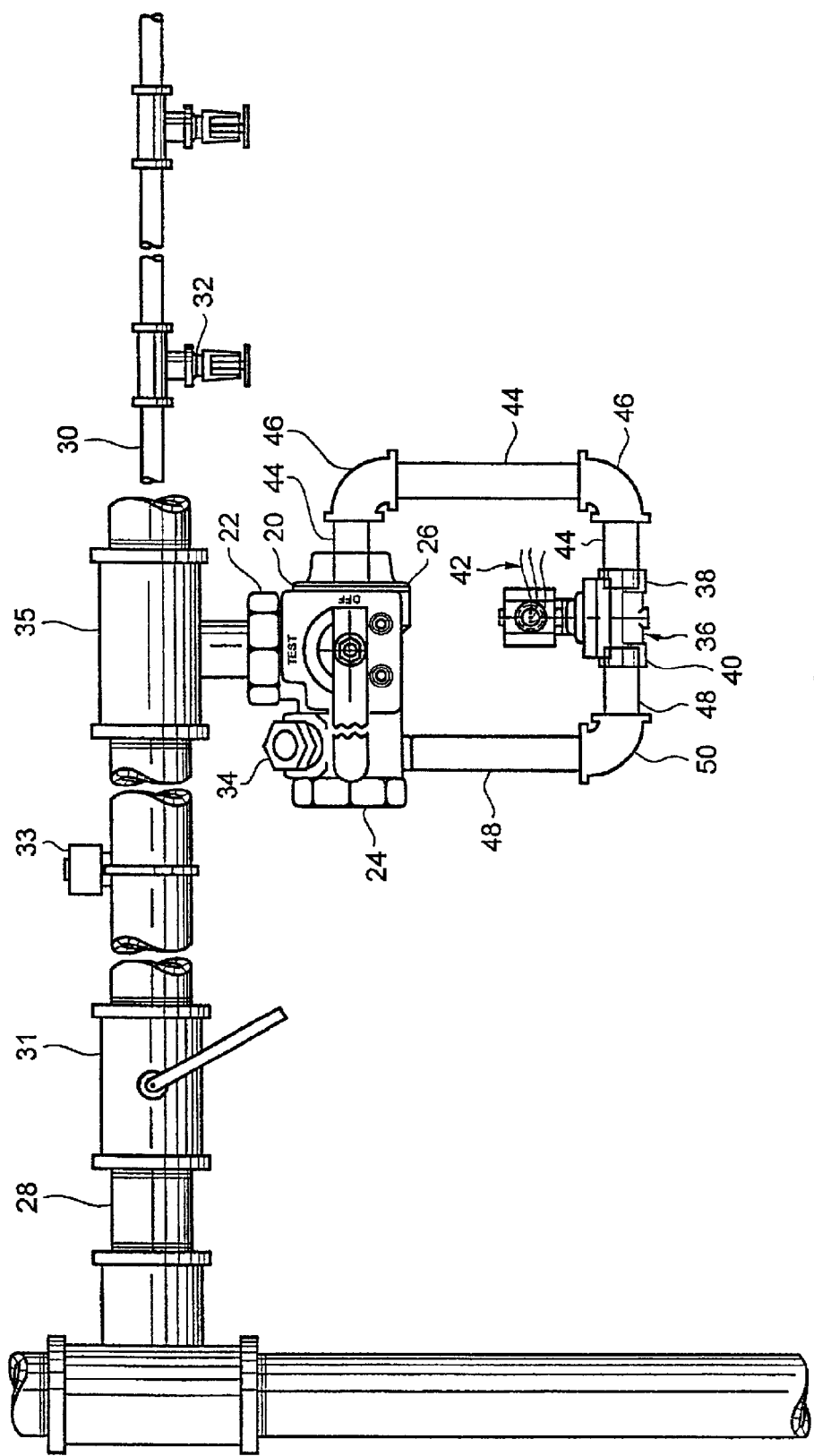
FIG. 1 is a side view of a valve arrangement according to the present invention.

With reference to FIG. 1, a preferred embodiment of an arrangement for testing a fire suppression water sprinkler system includes a valve 20 having a housing defining an inlet 22 and a first outlet 24. The inlet 22 and the first outlet 24 are perpendicular to one another with a second outlet 26 perpendicular to the inlet 22 and provided along a common axis with the first outlet 24.

The inlet 22 of the valve 20 is provided in fluid communication with a main water conduit 28 having a plurality of branch conduits 30 including a number of sprinkler heads 32. Typically, a supply valve 31 either for the entire fire suppression system or for a particular floor or for a portion of the system, is provided in the main water conduit 28 upstream of the valve 20. Downstream of the supply valve 31 is a flow switch 33 which is configured to detect a flow through the conduit 28 corresponding at least to the flow through a single sprinkler head 32.

The valve 20 is connected to the conduit 28 through a T-fitting 35 which supplies fluid to the inlet 22 of the valve 20. The valve 20 also includes a pair of sight glasses 34 in the first outlet 24 in order to permit a visual observation of a flow through the first outlet 24.

A solenoid valve 36 of suitable, conventional form has an inlet 38 and an outlet 40. The solenoid valve is electrically controlled by wires 42 which permit the solenoid valve to be opened and closed from a remote location. The inlet 38 of the solenoid valve 36 is connected to the second outlet 26 of the valve 20 through an arrangement of pipe nipples 44 and elbows 46. In the same way, an arrangement of pipe nipples 48 and an elbow 50 connect the outlet of the solenoid valve 36 to the first outlet of the valve 20 downstream of a seat 56 (see, FIG. 2b).

A suitable solenoid valve is, for example, a 2 way pilot operated slow closing solenoid valve such as the Red-Hat and Red-Hat II 8221 Series valves. Other types of remotely actuated valves could, of course, also be used such as, for example, an electrically or pneumatically actuated valve with remote capabilities, or any other type of suitable known valve.

The valve 20 is described in more detail in one or more of U.S. Pat. Nos. 5,103,862, 4,971,109, 4,995,423, 4,852, 610, 4,741,361 which are incorporated herein by reference, all of AGF Manufacturing, Inc.

If desired, the elbow 46 immediately downstream of the outlet 26 could be replaced by a T-fitting with the inlet of a pressure relief valve (not shown) provided in one branch of the T-fitting. Preferably, the outlet of the pressure relief valve is piped to the outlet 24 of the valve 20 downstream of the seat 56 such as through an additional tapping provided adjacent the sight glasses 34. In this way, a pressure relief function would be provided for the fire suppression system.

Figure 2A:
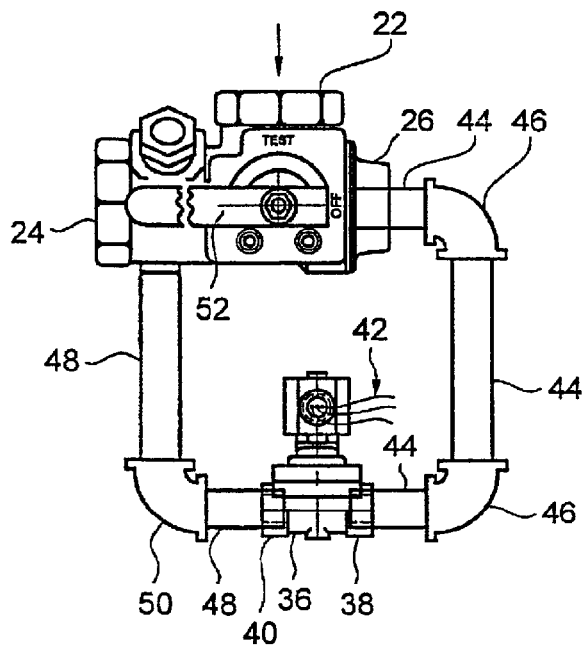
FIG. 2a is a view of the valve arrangement of FIG. 1 with one of the valves in the "off" configuration.
Figure 2B:
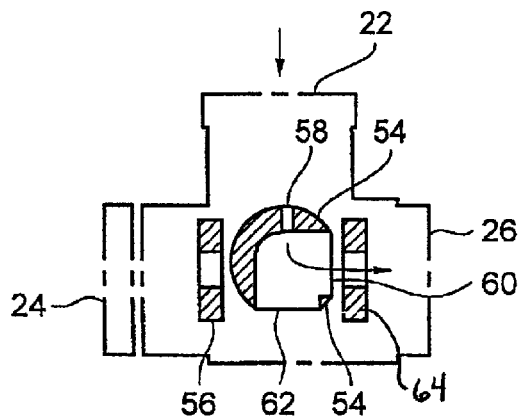

With reference now to FIG. 2a, the valve 20 includes a valve handle 52 which is movable between a first "off" position in which fluid communication between the inlet 22 and the first outlet 24 is prevented by a valve member 54 (see FIG. 2b) meeting the seat 56 provided within the valve housing. The valve member 54 has three openings or ports 58, 60, and 62 provided about a periphery of the valve member in communication with one another. The first opening or port 58 has a cross-sectional opening which permits a flow corresponding to the flow through a single sprinkler head of the fire suppression system. The second and third openings or ports 60, 62 have a cross-sectional opening corresponding to the unrestricted flow through the inlet and outlets of the valve. The valve housing also includes the valve seat 56 provided within the first outlet of the valve adjacent to the valve member 54 so that when a solid portion of the valve member is adjacent the valve seat 56 (when the valve handle is in the "off" position) flow through the valve to the first outlet is blocked.

When the handle 52 is in the "off" position, however, fluid communication is provided between the inlet 22 and the second outlet 26 of the valve 20 through the restricted opening 58 provided in the valve member. A valve seat 64 is provided adjacent to the valve member 54 within the second outlet of the valve 20. When the valve handle 52 is in the "off" position, the flow through the valve 20 from the inlet 22 to the second outlet 26 in a preferred embodiment corresponds to the flow through a single fire sprinkler head. However, as seen best in FIG. 2b, in a working environment of this arrangement it has been found that fluid may also flow around valve 54 and out of outlet 26. Accordingly, in order to ensure that the flow through the solenoid valve 36 (when it is opened) corresponds to the flow through a single fire sprinkler head of the system being tested, it may also be desirable to provide a further restricted opening in solenoid valve 36, or anywhere in line between second outlet 26 and the outlet 40 from the solenoid valve 35 (as discussed further below).

Figure 3A:
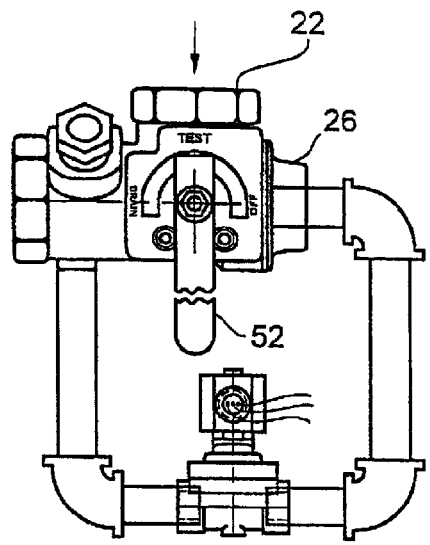
FIG. 3a is a view of the valve arrangement of FIG. 1 with one of the valves in the "test" configuration.
Figure 3B:
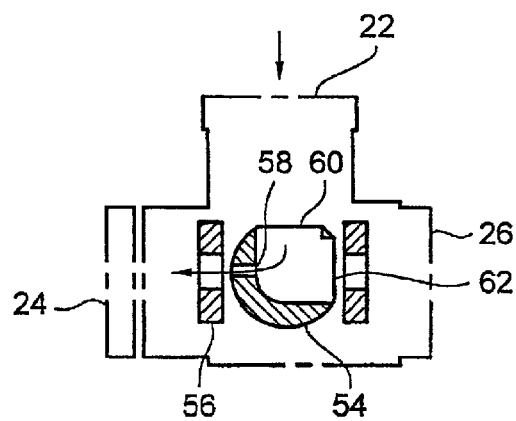

With reference to FIG. 3a, the handle 52 may be moved counter-clockwise from the "off" position to the "test" position with the valve member 54 (see, FIG. 3b) likewise rotated 90 degrees within the valve housing. In the "test" configuration, flow through the valve 20 from the inlet 22 to the first outlet 24 passes from the port 60 through the restricted opening 58 to permit a flow corresponding to the flow through a single sprinkler head. When the handle 52 is in the "test" position, the flow through the second outlet of the valve 20 is relatively unrestricted and does not correspond to the flow through a single fire sprinkler head. Accordingly, the solenoid valve 36 should be left in a closed configuration when the handle 52 is in the "test" position.

Figure 4A:
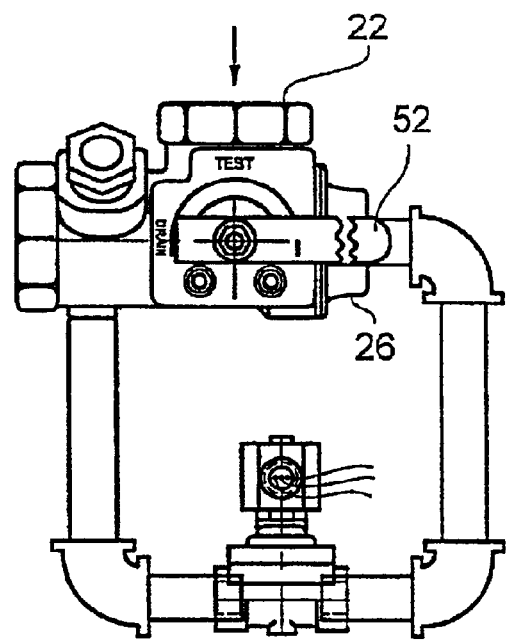
FIG. 4a is a view of the valve arrangement of FIG. 1 with one of the valves in the "drain" configuration.
Figure 4B:
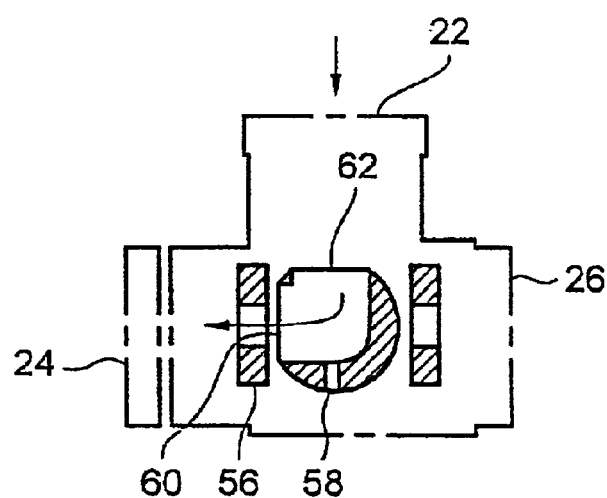

With reference now to FIG. 4a, when the handle 52 is moved another 90 degrees counter clockwise to the "drain" position, flow through the valve 20 from the inlet 22 to the first outlet 24 is relatively unrestricted to provide a rapid draining of the conduits. Because a solid portion of the valve member 54 is provided adjacent to the second outlet of the valve 20, no (or very little) flow is permitted through the second outlet 26 to the inlet of the solenoid valve 36. Accordingly, the solenoid valve 36 should be left in the closed configuration when the handle 52 is in the "drain" position.

In operation, when the valve 20 is in the "off" configuration (see FIGS. 2a and 2b), the flow is permitted by the valve member 54 through the second outlet 26 of the valve 20 preferably corresponding to the flow through a single sprinkler head. There will be no flow through the second outlet 26, however, while the solenoid valve 36 is in the normally closed configuration which prevents flow from the inlet 38 of the solenoid valve 36 to the outlet 40 of the solenoid valve. If it is desired to test the sprinkler system, the solenoid valve 36 may be electrically opened from a remote location through the wires 42. Opening of the solenoid valve 36 permits flow equivalent to a single sprinkler head to pass through the valve 36 which in turn permits flow from the conduits of the sprinkler system through the valve 20. The sensor, or flow switch 33, see FIG. 1, detects the flow through the conduits and through the solenoid valve and through the valve 20. In turn, the sensor either sends an alarm signal or triggers a mechanical alarm to indicate the fluid flow. In this way, the fire suppression system may be tested from a remote location such as from a security guard's station or from a central control station without requiring anyone to go to the solenoid valve.

It is expected that periodic manual testing of the fire sprinkler system will still be conducted either as a safety precaution or in compliance with local ordinances. However, the valve arrangement of the present invention permits the fire sprinkler system to be tested easily and conveniently which will in turn enable the fire sprinkler system to be tested more frequently without incurring significant cost or inconvenience.

Figure 5:
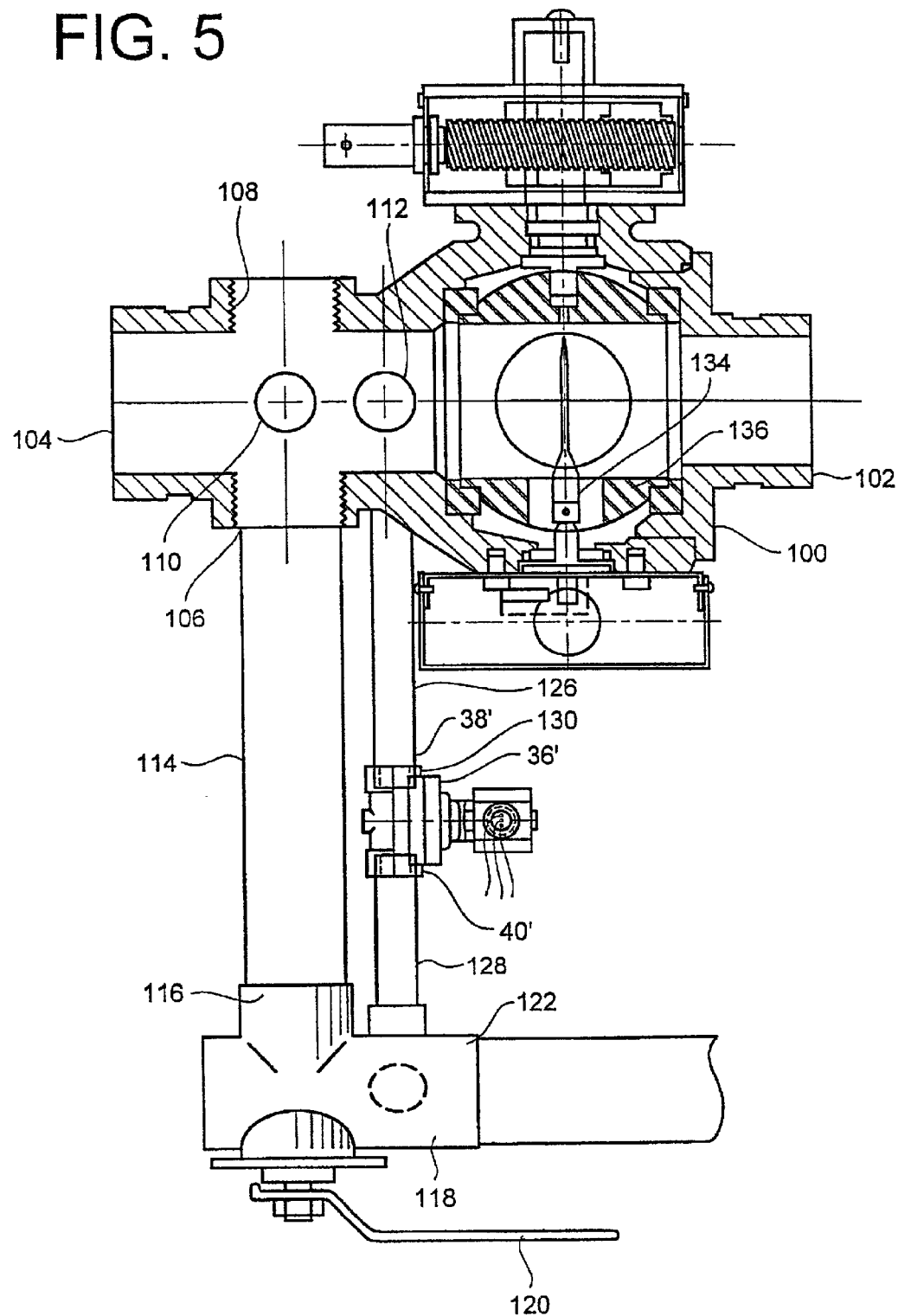
FIG. 5 is a side view in partial cross-section of another valve arrangement of the present invention.

With reference now to FIG. 5 another preferred embodiment of a valve arrangement according to the present invention includes a supply valve 100, typically for controlling the flow to a floor of a multi-floor building or to a portion of a large fire suppression system. The supply valve 100 has an operating gear mechanism to require that the valve be opened and closed slowly to prevent water hammer. The valve 100 preferably has an integral flow switch with a time delay circuit to prevent false alarms from water hammer. If desired, the supply valve may be provided with sight glasses in the outlet of the valve.

The supply valve has an inlet 102 which is in communication with a source of water or a fire suppression fluid. The supply valve 100 has an outlet 104 provided with a number of integral ports 106, 108, 110, and 112. The outlets 104 and 108 may be used to supply fluid to an array of main conduits and branch conduits having a number of fire suppression sprinkler heads (not shown). In the embodiment of FIG. 5, the outlet 106 is connected by a pipe nipple 114 to an inlet 116 of a test and drain valve 118.

As known in the art and as described in more detail in one or more of U.S. Pat. Nos. 5,103,862, 4,971,109, 4,995,423, 4,852,610, 4,741,361 which are incorporated herein by reference, all of AGF Manufacturing, Inc., the test and drain valve 118 is similar in operation to the valve 20 of FIG. 1. However, the configuration of the valve 118 is somewhat different from that of the valve 20 because an actuator handle 120 is provided opposite the inlet 116 rather than on the side of the valve.

As in the case of the valve 20, the valve 118 includes a valve member which is movable to a first "off" position in which fluid communication between the inlet 116 and an outlet 122 is prevented.

The valve member may be moved by the handle 120 from the "off" position to a "test" position in which flow through the valve 118 from the inlet 116 to the outlet 122 passes is restricted by the valve member to preferably correspond to the flow through a single sprinkler head.

The valve member may also be moved by the handle 120 to a "drain" position in which flow through the valve 118 from the inlet 116 to the outlet 122 is relatively unrestricted to provide a rapid draining of the conduits.

A solenoid valve 36' is provided with an inlet 38' of the solenoid valve 36' in fluid communication with the outlet 112 of the supply valve 100 through a pipe nipple 126 and any additional required elbows or other fittings. An outlet 40' of the solenoid valve 36' is in fluid communication with the outlet 122 of the valve 118 through a pipe nipple 128 and any additional pipe fittings as may be required.

Because the flow from the outlet 112 into the solenoid valve is not restricted to correspond to the flow through a single sprinkler head in the embodiment of FIG. 5, a restricted orifice 130 is provided in the solenoid valve having an opening which permits a flow corresponding to the flow through a single sprinkler head. The rate of flow for a given fluid at a given pressure is commonly designated as "k" or the "k factor" and so the "k factor" of the passageway through the solenoid valve 36' is preselected or adjusted so as to correspond to the "k factor" through a single sprinkler head in the fire suppression system.

Figure 6:
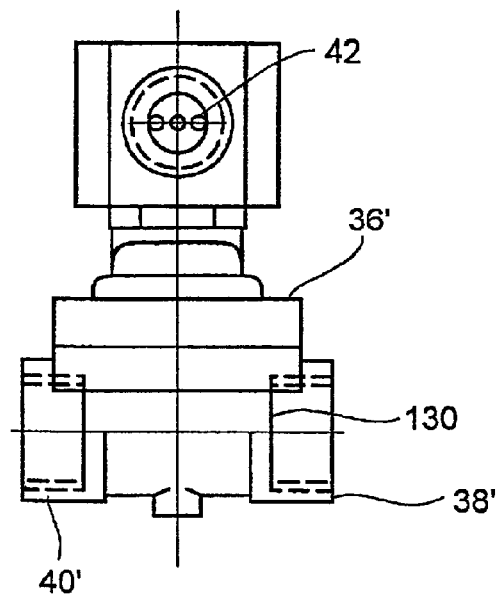
FIG. 6 is a side view in partial cross-section of a valve according to the present invention.

With reference to FIG. 6, the restricted orifice or opening 130 is provided by a disk or plate which is provided in the inlet 38' of the solenoid valve 36'. Alternatively, the restricted opening could be provided in the outlet of the solenoid valve or even in the pipe fittings connecting the inlet of the solenoid valve to the conduits or in the pipe fittings downstream of the solenoid valve outlet.

Figure 7:
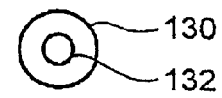
FIG. 7 is a side view of a restricted orifice of the valve of FIG. 6.
Figure 8:
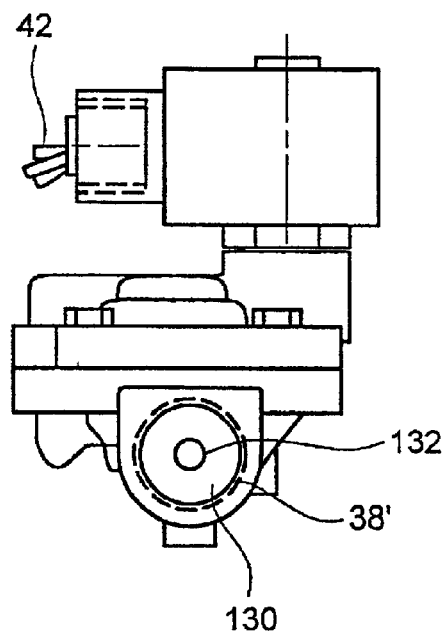
FIG. 8 is an end view in partial cross-section of the valve of FIG. 6.

If the restricted orifice or opening 130 is provided by a disk or plate, a hole 132 (see FIG. 7) is provided in the disk or plate which is then secured in the solenoid valve as by threading or by welding or brazing. In addition, the restricted orifice or opening could be formed integrally in the inlet or the outlet of the solenoid valve during manufacture either by proper molding or by machining or drilling an opening of suitable size.

Preferably, the supply valve 100 includes a flow sensor 134 which is provided within a ball valve member 136 of the supply valve. A flow through the supply valve from the inlet to the outlet corresponding at least to the flow through a single sprinkler head should be sufficient to deflect a paddle of the flow sensor 134 to thereby close a switch and sound an appropriate alarm or send an alarm signal.

In operation, the valve 118 and the solenoid valve 36' are both normally in the closed or off configurations. When it is desired to manually test the fire sprinkler system, the handle 120 of the valve 118 is moved to the "test" position which permits a flow through the valve 20 corresponding to a flow through a single sprinkler head. When desired, the handle 120 of the valve 118 may also be moved to a drain position to permit the fluid in the conduits to be drained through the outlet of the valve 118.

When it is desired to remotely test the system of FIG. 5, the valve 118 is left in the "off" configuration and a signal is sent through the wires 42 to the solenoid valve 36' to open the valve. Opening the valve remotely allows a flow through the conduit and in turn through the supply valve corresponding to the flow through a single sprinkler head to deflect the paddle and trigger the sensor 134.

When the test of the system has been completed, the signal to the solenoid valve 36' is stopped which causes the valve to return to the normally closed position and stop the flow through the valve which in turn causes the sensor 134 to return to its normal configuration and stop the alarm.

With reference now to FIG. 9*a*, another preferred embodiment of an arrangement for testing a fire suppression water sprinkler system includes a valve 200 having a housing defining an inlet 202 and a first outlet 204. The inlet 202 and the first outlet 204 are provided along a common axis with a second outlet 206 perpendicular to the inlet 202 and perpendicular to the outlet 204.

The inlet 202 of the valve 200 is provided in fluid communication with a main water conduit (not shown in this Fig.) having a plurality of branch conduits including a number of sprinkler heads.

The valve 200 may include a pair of sight glasses (not shown) in the first outlet 204 in order to permit a visual observation of a flow through the first outlet 204.

A solenoid valve 36' of suitable, conventional form has an inlet 38' and an outlet 40'. The solenoid valve is electrically controlled by wires 42 which permit the solenoid valve to be opened and closed from a remote location. The inlet 38' of the solenoid valve 36' is connected to the second outlet of the valve 200 through an arrangement of pipe nipples 44 and elbows 46. In the same way, an arrangement of pipe nipples 48 and an elbow 50 connect the outlet of the solenoid valve 36' to the first outlet of the valve 200.

With continued reference to FIG. 9*a*, the valve 200 includes a valve handle 252 which is movable between a "close" (or "off") position in which fluid communication between the inlet 202 and the first outlet 204 is prevented by a valve member 54' (see FIG. 9*b*) provided within the valve housing. The valve member 54' has three openings or ports 58', 60', and 62' provided about a periphery of the valve member in communication with one another. The first opening or port 58' has a cross-sectional opening which permits a flow corresponding to the flow through a single sprinkler head of the fire suppression system. The second and third openings or ports 60', 62' have a cross-sectional opening corresponding to the unrestricted flow through the inlet and outlets of the valve. The valve housing also includes a valve seat 56' provided within the first outlet of the valve adjacent to the valve member 54' so that when a solid portion of the valve member is adjacent the valve seat 56' (when the valve handle is in the "close" position) flow through the valve to the first outlet is blocked.

When the handle 252 is in the "close" position, however, fluid communication is provided between the inlet 202 and the second outlet 206 of the valve 200. In the embodiment of FIG. 9*b*, the flow to the second outlet is unrestricted and so the solenoid valve 36' needs to be provided with a restricted orifice or opening 130. Alternatively, the orientation of the valve member 54' and the configuration of the valve 200 could be changed to position the restricted opening 58' adjacent to the second opening 206 when the solid portion of the valve member 54' is adjacent the first opening 204. If so, the need for a restricted opening or orifice 130 in the solenoid valve may be obviated because the flow through the valve 200 to the solenoid valve through the second outlet 206 would preferably be restricted to correspond to the flow through a single fire sprinkler head.

With reference to FIG. 10*a*, the handle 252 may be moved counter-clockwise from the "close" position to a "test" position with the valve member 54' (see, FIG. 10*b*) likewise rotated 90 degrees within the valve housing. In the "test" configuration, flow through the valve 200 from the inlet 202 to the first outlet 204 passes from the port 62' through the restricted opening 58' to permit a flow corresponding to the flow through a single sprinkler head. When the handle 52 is in the "test" position, the flow through the second outlet of the valve 20 is blocked. Accordingly, the solenoid valve 36' should be left in a closed configuration when the handle 252 is in the "test" position.

In operation, when the valve 200 is in the "close" configuration (see FIGS. 9*a* and 9*b*), the flow is permitted by the valve member 54' through the second outlet 206 to the inlet of the solenoid valve. Either by the opening 58' or by a restricted opening or orifice provided in the inlet or outlet of the solenoid valve, the flow through the solenoid valve is restricted to correspond to the flow through a single sprinkler head. There will be no flow through the second outlet 206, however, while the solenoid valve 36' is in the normally closed configuration which prevents flow from the inlet 38' of the solenoid valve 36' to the outlet 40' of the solenoid valve. If it is desired to test the sprinkler system, the solenoid valve 36' may be electrically opened from a remote location through the wires 42. Opening of the solenoid valve 36' permits flow through the valve 36' which in turn permits flow from the conduits of the sprinkler system through the valve 200. A sensor (not shown in FIGS. 1–4b) detects the flow through the conduits and through the solenoid valve and through the valve 200. In turn, the sensor either sends an alarm signal or triggers a mechanical alarm to indicate the fluid flow. In this way, the fire suppression system may be tested from a remote location such as from a security guard's station or from a central control station without requiring anyone to go to the solenoid valve.

Figures 11, 12:
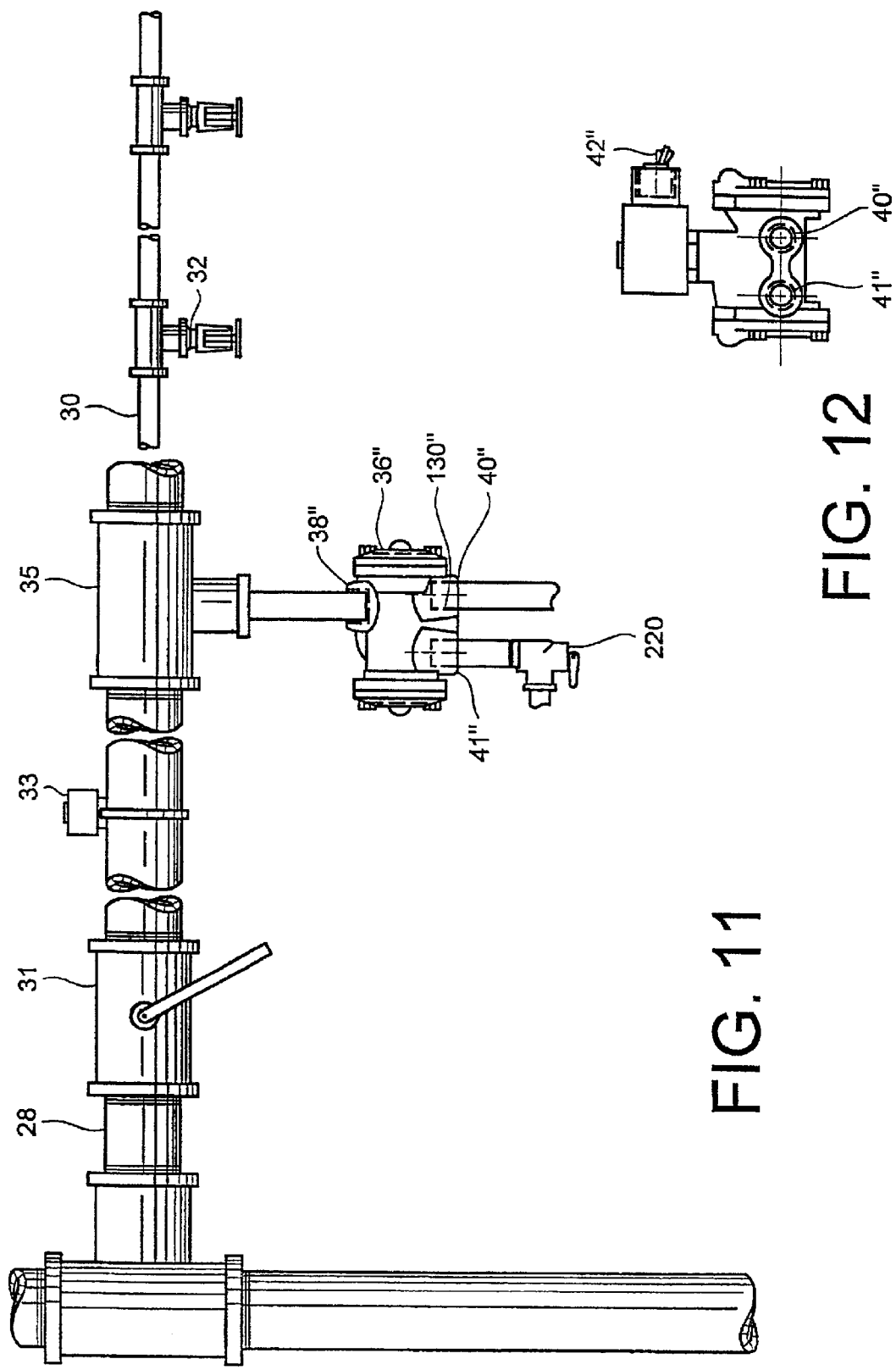
FIG. 11 is a side view of another valve arrangement according to the present invention.
FIG. 12 is an end view of the solenoid valve of the embodiment of FIG. 11.

With reference now to FIG. 11, another embodiment of the present invention includes a three way solenoid valve 36" having an inlet 38" and first and second outlets 40" and 41". The solenoid valve 36" is configured so that flow from the inlet 38" to the second outlet 41" is normally permitted and flow from the inlet 38" to the first outlet 40" is normally blocked when the solenoid valve 36" is not energized. When an electrical signal is sent to the solenoid valve 36" through the wires 42" (i.e., when the valve is energized), the flow from the inlet 38" to the second outlet 41" is blocked and flow from the inlet 38" to the first outlet 40" is permitted.

In order to enable the solenoid valve 36" to provide a testing configuration for the fire suppression system, a restricted opening or orifice 130" is provided in the first outlet 40" to cause the flow through the first outlet to correspond to the flow through a single sprinkler head when the appropriate signal has been sent to the valve. The second outlet 41" may be used to provide a pressure relief function for the fire suppression system by providing a pressure relief valve 220 downstream of the second outlet 41". The outlet of the pressure relief valve may then be piped to a drain as desired. In this way, the three way solenoid valve 36" with a restricted orifice or opening 130" provided in the first outlet provides a remotely controlled test configuration as well as a pressure relief function for the fire suppression system in a relatively simple and inexpensive manner.

If desired, both of the outlets of the valve 36" may be directed to a common pipe fitting which is connected to a drain. In addition, sight glasses may be provided in the first outlet of the valve. Moreover, the restricted orifice could be located physically outside of the solenoid valve such as downstream of the first outlet 40".

A suitable 3 way solenoid valve is, for example, the 3 way pilot operated air and water solenoid valves identified as Red-Hat II Series 8316. As explained above, the valve needs to be provided with a restricted orifice or opening so as to limit the flow through one of the outlets during a test configuration to correspond to the flow through a single sprinkler head of the system to be tested.

Referring next to FIGS. 13A and 13B, another embodiment of the present invention includes a manual test valve 200' and a 3 way solenoid valve 36". The valve 200' includes a valve handle 252 which is movable between an "off" (or "closed") position in which fluid communication between the inlet 202 and the first outlet 204 is prevented by a valve member 54' provided within the valve housing. The valve member 54' has three openings or ports 58', 60', and 62' provided about a periphery of the valve in communication with one another. The first opening or port 58' has a cross-sectional opening which permits a flow corresponding to the flow through a single sprinkler head of the first suppression system. The second and third openings or ports 60' and 62' have a cross-sectional opening corresponding to the unrestricted flow through the inlet and outlets of the valve. The valve housing also includes a valve seat 56' provided within the first outlet of the valve adjacent to the valve member 54' so that when a solid portion of the valve member is adjacent the valve seat 56' (when the valve handle is in the "off" position) flow through the valve to the first outlet 204 is blocked.

When the handle 252 is in the "off" position, fluid communication is provided between the inlet 202 and the second outlet 206 of the valve 200'. The second outlet 206 is arranged in fluid communication with the 3 way solenoid valve 36" having an inlet 38" and first and second outlets 40" and 41". The solenoid valve 36" is configured so that flow from the inlet 38" to the second outlet 41" is normally permitted and flow from the inlet 38" to the first outlet 40" is normally blocked when the solenoid valve 36" is not energized. When an electrical signal is sent to the solenoid valve 36" through the wires 42" (i.e., when the valve is energized), the flow from the inlet 38" to the second outlet 41" is blocked and flow from the inlet 38" to the first outlet 40" is permitted.

In order to enable the solenoid valve 36" to provide a testing configuration for the fire suppression system, a restricted opening or orifice 130" is provided in the first outlet 40" to cause the flow through the first outlet to correspond to the flow through a single sprinkler head when the appropriate signal has been sent to the valve. The second outlet 41" may be used to provide a pressure relief function for the fire suppression system by providing a pressure relief valve 220 downstream of the second outlet 41". The outlet of the pressure relief valve may then be piped to a drain as desired. Alternatively, the pressure relief valve may be omitted and the second outlet 41" is allowed to drain.

As described above with reference to FIGS. 11 and 12, the 3 way solenoid valve 36" may be remotely activated so as to remotely test the sprinkler system alarm. That is, when the solenoid 36" is electrically opened from a remote location through the wires 42", the solenoid is activated to permit a flow through the restricted orifice 130" corresponding to one sprinkler head. If for some reason, however, the solenoid 36" is activated and no alarm results, the inspector or other fire system technician can manually test the alarm system by manual operation of the valve 200'.

That is, with reference to FIGS. 14A and 14B, the handle 252' may be moved counterclockwise from the "off" position to a "test" position with the valve member 54' likewise rotated 90° within the valve housing. In the "test" configuration, flow through the valve 200' from the inlet 202 to the first outlet 204 passes from the port 62' through the restricted opening 58' to permit a flow corresponding to the flow through a single sprinkler head. When the handle 252 is in the "test" position, the flow through the second outlet 206 of the valve 200' is blocked. Accordingly, the solenoid valve 36" should be left in a closed configuration when the handle 252 is in the "test" position.

In operation, when the valve 200' is in the "off" configuration, the flow is permitted by the valve member 54' through the second outlet 206 to the inlet of the solenoid valve 36". If it is desired to test the sprinkler system, the solenoid valve 36" may be electrically opened from a remote location through the wires 42". Opening of the solenoid valve 36" permits flow through the valve 36" which in turn permits flow from the conduits of the sprinkler system through the valve 200. A sensor detects the flow through the conduits and through the solenoid valve and through the valve 200". In turn, the sensor either sends an alarm signal or triggers a mechanical alarm to indicate the fluid flow. The manual test valve 200' thereby permits a manual confirmation of the flow test of the sprinkler system which is performed by remotely actuating the solenoid valve.

With reference now to FIGS. 15A and 15B, the valve 200' includes a valve handle 252 which is movable between a first "off" position in which fluid communication between the inlet 202 and the first outlet 204 is prevented by a valve member 54' (see FIG. 15B) meeting the seat 56' provided within the valve housing. The valve member 54' has three openings or ports 58', 60', and 62' provided about a periphery of the valve member in communication with one another. The first opening or port 58' has a cross-sectional opening which permits a flow corresponding to the flow through a single sprinkler head of the fire suppression system. The second and third openings or ports 60', 62' have a cross-sectional opening corresponding to the unrestricted flow through the inlet and outlets of the valve. The valve housing also includes the valve seat 56' provided within the first outlet of the valve adjacent to the valve member 54' so that when a solid portion of the valve member is adjacent the valve seat 56' (when the valve handle is in the "off" position) flow through the valve to the first outlet is blocked.

When the handle 252 is in the "off" position, fluid communication is provided between the inlet 202 and the second outlet 206 of the valve 200'. The second outlet 206 is arranged in fluid communication with the 2 way solenoid valve 36' having an inlet 38' and an outlet 40'. The solenoid valve 36' is configured so that flow from the inlet 38' to the outlet 40' is normally blocked when the solenoid valve 36' is not energized. When an electrical signal is sent to the solenoid valve 36' through the wires 42' (i.e., when the valve is energized), the flow from the inlet 38' to outlet 40' is permitted.

In order to enable the solenoid valve 36' to provide a testing configuration for the fire suppression system, a restricted opening or orifice 130' is provided in the outlet 40' to cause the flow through the first outlet to correspond to the flow through a single sprinkler head when the appropriate signal has been sent to the valve.

With reference to FIGS. 16A and 16B, in order to confirm the test results of the solenoid valve 36', the handle 252' may be manually moved counterclockwise from the "off" position to a "test" position with the valve member 54' likewise rotated 90° within the valve housing. In the "test" configuration, flow through the valve 200' from the inlet 202 to the first outlet 204 passes from the port 62' through the restricted opening 58' to permit a flow corresponding to the flow through a single sprinkler head. When the handle 252 is in the "test" position, the flow through the second outlet 206 of the valve 200' is blocked. Accordingly, the solenoid valve 36' should be left in a closed configuration when the handle 252 is in the "test" position.

In operation, when the valve 200' is in the "off" configuration, the flow is permitted by the valve member 54' through the second outlet 206 to the inlet of the solenoid valve 36". If it is desired to test the sprinkler system, the solenoid valve 36' may be electrically opened from a remote location through the wires 42". Opening of the solenoid valve 36' permits flow through the valve 36' which in turn permits flow from the conduits of the sprinkler system through the valve 200'. A sensor detects the flow through the conduits and through the solenoid valve and through the valve 200'. In turn, the sensor either sends an alarm signal or triggers a mechanical alarm to indicate the fluid flow. The manual test valve 200' thereby permits a manual confirmation of the flow test of the sprinkler system that is operated through the remotely controlled solenoid valve.

Although the preferred embodiments disclose the use of a suitable, conventional solenoid valve, other remotely controlled valves may be used in place of the solenoid valve as will be apparent to one skilled in the art upon reading the present specification.

The principles, preferred embodiments and mode of operation of the present invention have been described in the foregoing specification. However, the invention which is intended to be protected is not to be construed as limited to the particular embodiments disclosed. The embodiments are therefore to be regarded as illustrative rather than as restrictive. Variations and changes may be made without departing from the spirit of the present invention. Accordingly, it is expressly intended that all such equivalents, variations and changes which fall within the spirit and scope of the present invention as defined in the claims be embraced thereby.

What is claimed is:

1. A valve arrangement for use in a fire suppression sprinkler system, said valve arrangement comprising:

valve means for controlling the flow of a fluid, said valve means comprising an inlet and first and second outlets, said valve means comprising a first configuration selectively permitting flow from the inlet to the second outlet and preventing flow from the inlet to the first outlet, and a second configuration selectively permitting flow from the inlet to the first outlet and preventing flow from the inlet to the second outlet;

means for restricting the flow through the first outlet of the valve means to a preselected rate corresponding to the flow through a single fire suppression sprinkler;

means for remotely controlling said valve means between said first and second configurations;

wherein said valve means comprises a solenoid valve.

2. The valve arrangement of claim 1, wherein said valve means is controlled electrically.

3. The valve arrangement of claim 2, wherein said valve means comprises a three way solenoid valve.

4. The valve arrangement of claim 3 wherein said means for restricting the flow through the first outlet of the valve means comprises a restricted opening in said first outlet.

5. The valve arrangement of claim 4 wherein a pressure relief valve is provided downstream of said second outlet.

6. A valve arrangement for use in a fire suppression sprinkler system, said valve arrangement comprising:

valve means for controlling the flow of a fluid, said valve means comprising an inlet and first and second outlets, said valve means comprising a first configuration selectively permitting flow from the inlet to the second outlet and preventing flow from the inlet to the first outlet, and a second configuration selectively permitting flow from the inlet to the first outlet and preventing flow from the inlet to the second outlet;

means for restricting the flow through the first outlet of the valve means to a preselected rate corresponding to the flow through a single fire suppression sprinkler at least while the valve means is in the second configuration; and means for remotely controlling said valve means between said first and second configurations;

wherein said valve means comprises a solenoid valve.

7. The valve arrangement of claim 6, wherein said valve means is controlled electrically.

8. The valve arrangement of claim 7, wherein said valve means comprises a three way solenoid valve.

9. The valve arrangement of claim 8, wherein said means for restricting the flow through the first outlet of the valve means comprises a restricted opening in said first outlet.

10. The valve arrangement of claim 9, wherein a pressure relief valve is provided downstream of said second outlet.

11. A valve arrangement for remotely and manually testing a fire suppression sprinkler system, said valve arrangement comprising:

conduit means for supplying a fire suppression fluid to a plurality of sprinklers;

means for sensing a flow of said fire suppression fluid in said conduit means;

supply valve means for controlling a flow of fluid through said conduit means;

first testing valve means for testing the means for sensing a flow of said fire suppression fluid in said conduit means, said first testing valve means comprising an inlet, a first outlet and a second outlet, said first testing valve means comprising a first configuration selectively preventing flow from the inlet to the second outlet and a second configuration selectively permitting flow from the inlet to the second outlet at a preselected rate corresponding to the flow through a single fire suppression sprinkler; and second testing valve means for testing the means for sensing a flow of said fire suppression fluid in said conduit means, said second testing valve means comprising an inlet, a first outlet and a second outlet, said second testing valve means comprising a first configuration selectively allowing flow from the inlet to the second outlet and a second configuration selectively permitting flow from the inlet to the first outlet at a preselected rate corresponding to the flow through a single fire suppression sprinkler; said inlet of said second valve means being in communication with the conduit means downstream of the first testing valve means.

12. The valve arrangement of claim 11, wherein said second testing valve means is controlled electrically.

13. The valve arrangement of claim 11, wherein said second testing valve means is remotely controlled.

14. The valve arrangement of claim 12, wherein said second testing valve means comprises a solenoid valve.

15. The valve arrangement of claim 13 wherein said second testing valve means includes a restricted opening in said second testing valve means.

16. The valve arrangement of claim 14 wherein said fire suppression fluid is water.

17. The valve arrangement of claim 11 wherein said first testing valve means is manually operable and said second testing valve means is remotely controlled.

18. The valve arrangement of claim 11 wherein the second outlet of the second testing valve means comprises a pressure relief valve.

* * * * *